United States Patent
Ji et al.

(10) Patent No.: US 9,713,158 B2
(45) Date of Patent: Jul. 18, 2017

(54) MAXIMUM POWER REDUCTION FOR INTERFERENCE CONTROL IN ADJACENT CHANNELS

(71) Applicant: QUALCOMM Incorporated, San Diego, CA (US)

(72) Inventors: Tingfang Ji, San Diego, CA (US); Peter Gaal, San Diego, CA (US); William R. Panton, San Diego, CA (US); Gene Fong, San Diego, CA (US); Philip D. Coan, San Diego, CA (US); Sumit Verma, San Diego, CA (US); Edward George Tiedemann, Jr., Concord, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/188,884

(22) Filed: Jun. 21, 2016

(65) Prior Publication Data

US 2016/0302205 A1    Oct. 13, 2016

Related U.S. Application Data

(62) Division of application No. 13/743,185, filed on Jan. 16, 2013, now Pat. No. 9,408,217.

(Continued)

(51) Int. Cl.
*H04W 52/14* (2009.01)
*H04W 72/04* (2009.01)
(Continued)

(52) U.S. Cl.
CPC ....... *H04W 72/0473* (2013.01); *H04L 5/0041* (2013.01); *H04W 52/146* (2013.01);
(Continued)

(58) Field of Classification Search
CPC   H04L 5/0041; H04W 52/146; H04W 52/244; H04W 52/365; H04W 52/367; H04W 72/0473; Y02B 60/50
(Continued)

(56) References Cited

U.S. PATENT DOCUMENTS 8,325,657 B2    12/2012  Fox et al.
9,113,422 B2 *   8/2015  Jeong ................. H04W 52/146
(Continued)

FOREIGN PATENT DOCUMENTS

EP          2334124 A1      6/2011
WO    WO-2008123148 A1    10/2008
WO    WO-2011/122833 A2   10/2011

OTHER PUBLICATIONS

International Search Report and Written Opinion, PCT/US2013/021979, ISA/EPO, Mar. 26, 2013.
(Continued)

*Primary Examiner* — Tan H Trinh

(57) ABSTRACT

Techniques for determining power relaxation values are disclosed. The power relaxation values may be determined according to an ending resource block (RB) and a number of RBs in a contiguous allocation. In one aspect, the power relaxation values are arranged into regions based, at least in part, on transmission channel bandwidths and the distance from a protected adjacent channel. A user equipment (UE) can determine a power relaxation value for its current allocation using the ending RB index and contiguous RB length and can adjust its transmission power accordingly. Evolved NodeBs may estimate the power relaxation that a particular UE has selected in order to more accurately determine the transmit power available to the UE. Using the more accurate estimate of transmit power, the eNB may schedule the UE for uplink transmissions accordingly.

12 Claims, 12 Drawing Sheets

Related U.S. Application Data

(60) Provisional application No. 61/587,575, filed on Jan. 17, 2012.

(51) Int. Cl.
*H04W 52/36* (2009.01)
*H04L 5/00* (2006.01)
*H04W 52/24* (2009.01)

(52) U.S. Cl.
CPC ....... *H04W 52/365* (2013.01); *H04W 52/367* (2013.01); *H04W 52/244* (2013.01); *Y02B 60/50* (2013.01)

(58) Field of Classification Search
USPC ........ 455/522, 69, 450, 436, 13.4, 512, 509, 455/552.1, 115.3, 135, 220; 370/252, 370/329, 328, 335
See application file for complete search history.

(56) References Cited

U.S. PATENT DOCUMENTS

| | | | |
|---|---|---|---|
| 2010/0255868 A1 | 10/2010 | Lee et al. | |
| 2011/0274092 A1* | 11/2011 | Liu | H04W 72/10 370/335 |
| 2012/0044882 A1* | 2/2012 | Kim | H04L 5/0058 370/329 |
| 2012/0075989 A1 | 3/2012 | Roessel et al. | |
| 2012/0087317 A1* | 4/2012 | Bostrom | H04W 52/30 370/329 |
| 2012/0176979 A1* | 7/2012 | Kim | H04W 52/146 370/329 |
| 2012/0236735 A1* | 9/2012 | Nory | H04W 52/365 370/252 |
| 2012/0275413 A1 | 11/2012 | Hong et al. | |
| 2012/0302173 A1 | 11/2012 | Bostrom et al. | |
| 2012/0307771 A1 | 12/2012 | Yang et al. | |
| 2012/0327866 A1* | 12/2012 | Krishnamurthy | H04W 52/10 370/329 |
| 2013/0039289 A1* | 2/2013 | Lee | H04W 52/367 370/329 |
| 2013/0176952 A1* | 7/2013 | Shin | H04L 5/001 370/329 |
| 2013/0182661 A1* | 7/2013 | Piipponen | H04W 72/0473 370/329 |
| 2013/0182663 A1* | 7/2013 | Ji | H04W 72/0473 370/329 |
| 2013/0188563 A1* | 7/2013 | Kim | H04W 52/365 370/328 |
| 2013/0201857 A1* | 8/2013 | Bhargava | H04K 3/222 370/252 |
| 2013/0250889 A1* | 9/2013 | Kim | H04L 5/001 370/329 |
| 2014/0086195 A1* | 3/2014 | Jung | H04W 52/367 370/329 |
| 2015/0215877 A1* | 7/2015 | Ahn | H04W 72/0413 455/522 |
| 2015/0341870 A1* | 11/2015 | Kim | H04W 52/367 370/329 |

OTHER PUBLICATIONS

Qualcomm Incorporated: "A-MPR for NS_04," 3GPP Draft; R4-103063, 3rd Generation Partnership Project (3GPP), Mobile Competence Centre; 650, Route Des Lusioles; F-06921 Sophia-Antipolis Cedex; France, vol. RAN WG4, No. Madrid, Spain; Aug. 23, 2010, Aug. 19, 2010 (Aug. 19, 2010), XP050454333.

3GPP, 3rd Generation Partnership Project Technical Specification group Radio Access Network Evolved Universal Terristrial Access (E-UTRA) LTE TDD 2600 MHz in US Work Item Technical Report Release 10, Dec. 2010, pp. 33.

3GPP TR 36.812: "3rd Generation Partnership Project; Technical Specification Group Radio Access Network; Evolved Universal Terrestrial Radio Access (E-UTRA); LTE TDD 2600MHz in US Work Item Technical Report", Version 10.1.0, Release 10, (Oct. 2012), Jan. 7, 2011, pp. 10-11, http://www.3gpp.org/ftp/Specs/archive/36_series/36.812/36812-a10.zip.

Clearwire: "A-MPR aspects for LTE_TDD_2600_US WI", 3GPP TSG-RAN WG4 AdHoc Mar. 2010 R4-102724, Jul. 1, 2010, pp. 1-10, http://www.3gpp.org/ftp/tsg_ran/WG4_Radio/TSGR4_AHs/R4_AH#03_Bratislava_June_2010/Documents/R4-102724.zip.

Qualcomm Incorporated: "A-MPR Requirements for B26 to Public Safety", 3GPP TSG-RAN WG4 AdHoc Band 26 R4-B26ah-0050, Jan. 30, 2012, pp. 1-15, http://www.3gpp.org/ftp/tsg_ran/WG4_Radio/TSGR4_AHs/R4_AH_Band-26/Docs/R4-B26ah-0050.zip.

\* cited by examiner

MAXIMUM POWER REDUCTION FOR INTERFERENCE CONTROL IN ADJACENT CHANNELS

CROSS-REFERENCE TO RELATED APPLICATIONS

This application is a division of U.S. patent application Ser. No. 13/743,185, entitled, "MAXIMUM POWER REDUCTION FOR INTERFERENCE CONTROL IN ADJACENT CHANNELS," filed on Jan. 16, 2013, which claims the benefit of U.S. Provisional Patent Application No. 61/587,575, entitled, "MAXIMUM POWER REDUCTION FOR INTERFERENCE CONTROL IN ADJACENT CHANNELS," filed on Jan. 17, 2012, both of which are expressly incorporated by reference herein in their entirety.

BACKGROUND

Field

Aspects of the present disclosure relate generally to wireless communication systems, and more particularly, to maximum power reduction for interference control in adjacent channels.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities for interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes determining, at a mobile device, an ending resource block (RB) index and a length of a contiguous RB allocation in a plurality of RBs allocated to the mobile device and identifying, based on the ending RB index and the length of the contiguous RB allocation, a power relaxation allowance for uplink transmissions of the mobile device.

In another aspect of the disclosure, a method for wireless communication includes receiving, at an eNB, a power headroom report from a mobile device, determining an ending RB index and a length of a contiguous RB allocation in a plurality of RBs currently allocated to the mobile device, identifying, based on the ending RB index and the length of the contiguous RB allocation, a power relaxation allowance in a table of power relaxation allowances, determining an available power of the mobile device based on the identified power relaxation allowance and the power headroom report, and scheduling the mobile device for uplink transmission based, at least in part, on the determined available power.

In a further aspect of the present disclosure, a method for wireless communication includes receiving an indication at a mobile device from a serving eNB, wherein the indication identifies heightened emission limits for an allocated band, determining an ending RB index and a length of a contiguous RB allocation in an allocated plurality of RBs, identifying, based on the ending RB index and the length of the contiguous RB allocation, a power relaxation allowance in a table of power relaxation allowances, wherein power relaxation allowances correspond to a plurality of regions defined based on a transmission channel bandwidth and a distance from an adjacent band, and wherein the identified power relaxation allowance is located in one of the plurality of regions associated with the ending RB index and the length of the contiguous RB allocation, and adjusting transmission power at the mobile device according to the indication.

In an additional aspect of the present disclosure, an apparatus configured for wireless communication includes means for determining, at a mobile device, an ending resource block (RB) index and a length of a contiguous RB allocation in plurality of RBs allocated to the mobile device and means for identifying, based on the ending RB index and the length of the contiguous RB allocation, a power relaxation allowance for uplink transmissions of the mobile device.

In an additional aspect of the present disclosure, an apparatus configured for wireless communication including means for receiving, at an eNB, a power headroom report from a mobile device, means for determining an ending RB index and a length of a contiguous RB allocation in a plurality of RBs currently allocated to the mobile device, means for identifying, based on the ending RB index and the length of the contiguous RB allocation, a power relaxation allowance in a table of power relaxation allowances, means for determining an available power of the mobile device based on the identified power relaxation allowance and the power headroom report, and means for scheduling the mobile device for uplink transmission based, at least in part, on the determined available power.

In an additional aspect of the present disclosure, an apparatus configured for wireless communication including means for receiving an indication at a mobile device from a serving eNB, wherein the indication identifies heightened emission limits for an allocated band, means for determining an ending RB index and a length of a contiguous RB allocation in an allocated plurality of RBs, means for identifying, based on the ending RB index and the length of the contiguous RB allocation, a power relaxation allowance in a table of power relaxation allowances, wherein power relaxation allowances correspond to a plurality of regions defined based on a transmission channel bandwidth and a distance from an adjacent band, and wherein the identified power relaxation allowance is located in one of the plurality of regions associated with the ending RB index and the length of the contiguous RB allocation, and means for adjusting transmission power at the mobile device according to the indication.

In an additional aspect of the present disclosure, a computer program product for wireless communications in a wireless network includes a non-transitory computer-readable medium having program code recorded thereon. The program code includes program code to cause a computer to perform the methods described in FIGS. 7-9.

In an additional aspect of the present disclosure, an apparatus configured for wireless communication. The apparatus includes at least one processor and a memory coupled to the processor. The processor is configured to determine, at a mobile device, an ending RB index and a length of a contiguous RB allocation in plurality of RBs allocated to the mobile device and to identify, based on the ending RB index and the length of the contiguous RB allocation, a power relaxation allowance for uplink transmissions of the mobile device.

In an additional aspect of the present disclosure, an apparatus configured for wireless communication. The apparatus includes at least one processor and a memory coupled to the processor. The processor is configured to receiving, at an eNB, a power headroom report from a mobile device, to determine an ending RB index and a length of a contiguous RB allocation in a plurality of RBs currently allocated to the mobile device, to identify, based on the ending RB index and the length of the contiguous RB allocation, a power relaxation allowance in a table of power relaxation allowances, to determine an available power of the mobile device based on the identified power relaxation allowance and the power headroom report, and to schedule the mobile device for uplink transmission based, at least in part, on the determined available power.

In an additional aspect of the present disclosure, an apparatus configured for wireless communication. The apparatus includes at least one processor and a memory coupled to the processor. The processor is configured to receiving an indication at a mobile device from a serving eNB, wherein the indication identifies heightened emission limits for an allocated band, to determine an ending RB index and a length of a contiguous RB allocation in an allocated plurality of RBs, to identify, based on the ending RB index and the length of the contiguous RB allocation, a power relaxation allowance in a table of power relaxation allowances, wherein power relaxation allowances correspond to a plurality of regions defined based on a transmission channel bandwidth and a distance from an adjacent band, and wherein the identified power relaxation allowance is located in one of the plurality of regions associated with the ending RB index and the length of the contiguous RB allocation, and to adjust transmission power at the mobile device according to the indication.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
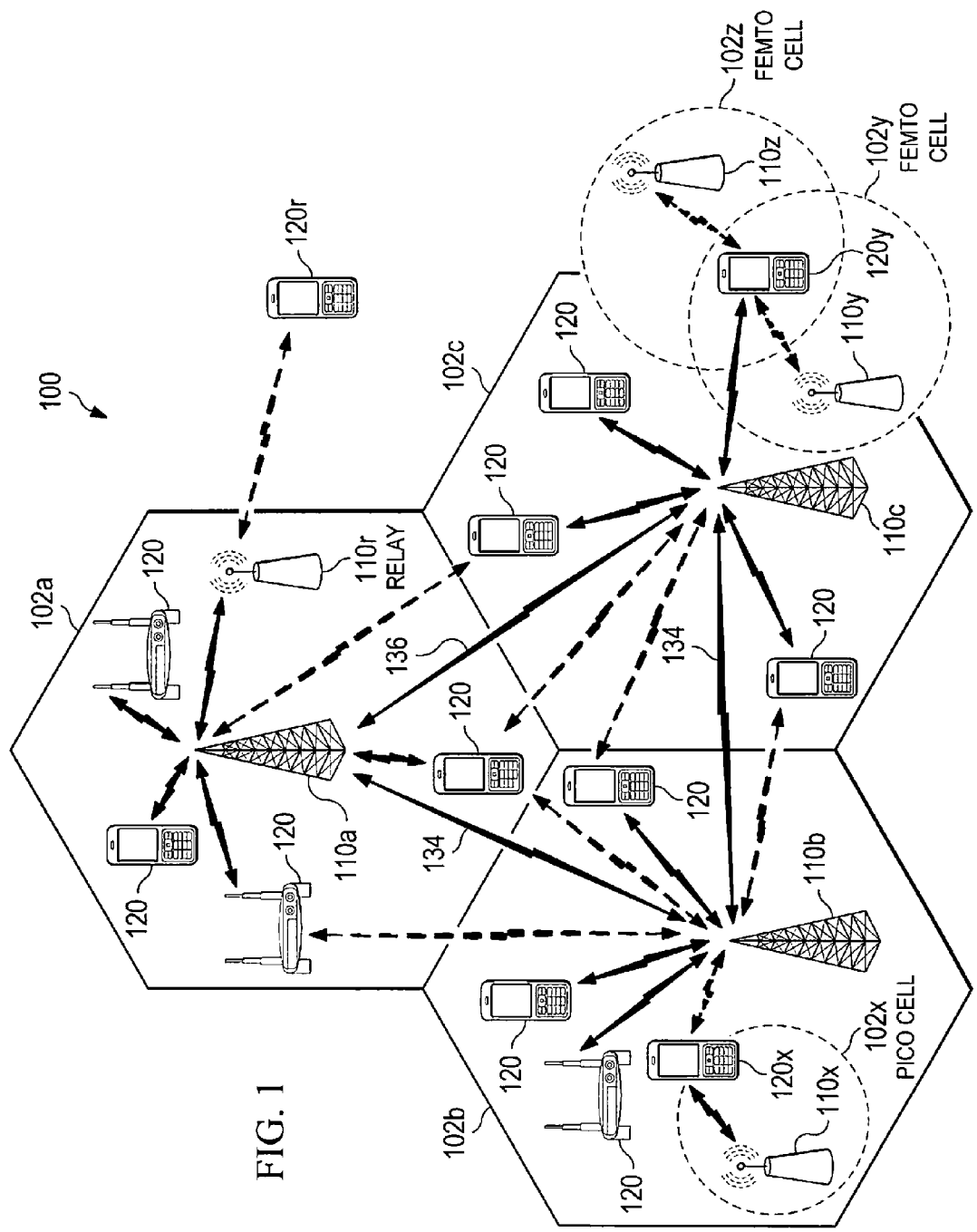
FIG. 1 is a block diagram illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

The wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by an eNB 110 based on signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

Figure 2:
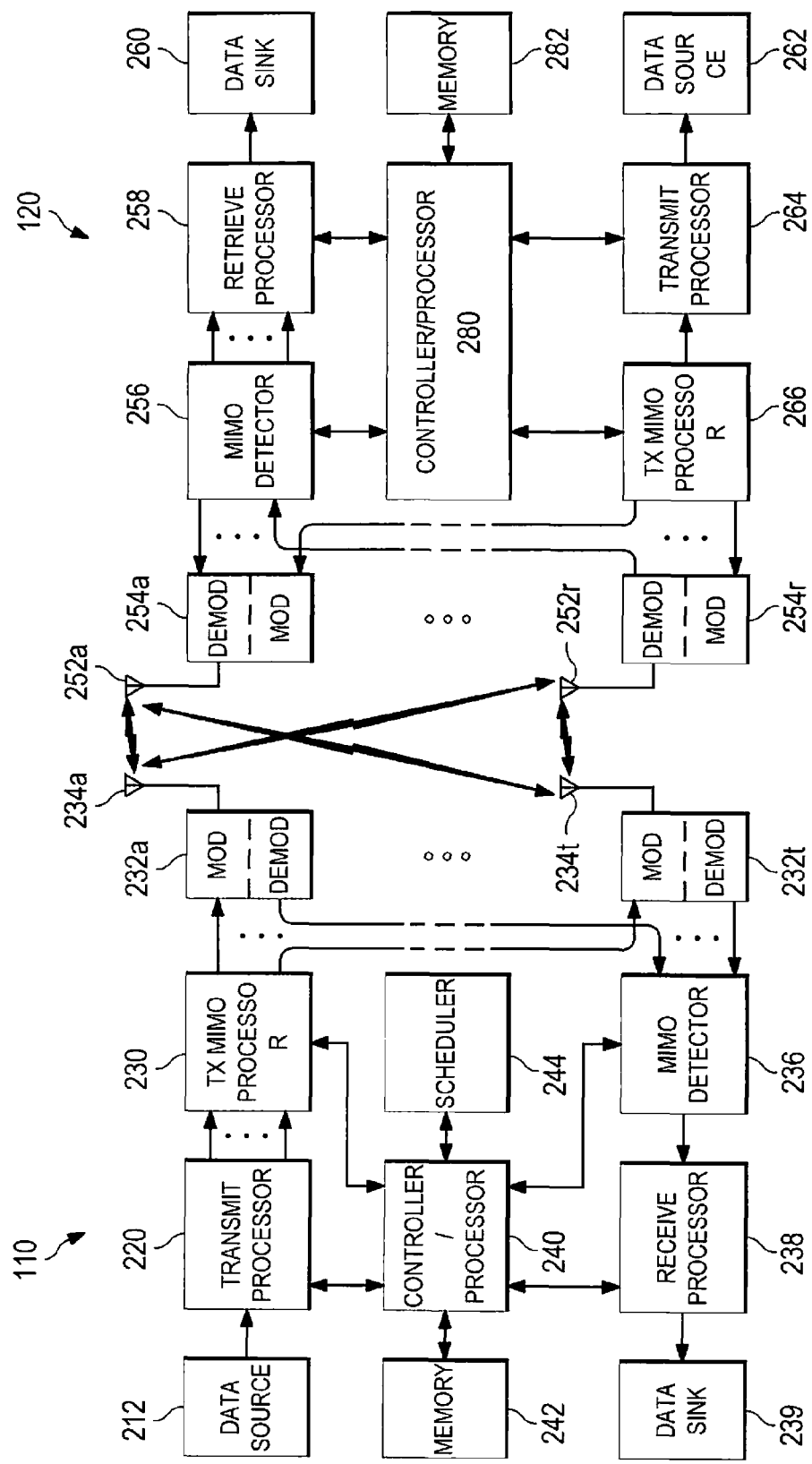
FIG. 2 is a block diagram illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 234a through 234t, and the UE 120 may be equipped with antennas 252a through 252r.

At the eNB 110, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the eNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the eNB 110. At the eNB 110, the uplink signals from the UE 120 may be received by the antennas 234, processed by the modulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the eNB 110 and the UE 120, respectively. The controller/processor 240 and/or other processors and modules at the eNB 110 may perform or direct the execution of various processes for the techniques described herein. The controllers/processor 280 and/or other processors and modules at the UE 120 may also perform or direct the execution of the functional blocks illustrated in FIGS. 7-9, and/or other processes for the techniques described herein. The memories 242 and 282 may store data and program codes for the eNB 110 and the UE 120, respectively. A scheduler 244 may schedule UEs for data transmission on the downlink and/or uplink.

When transmitting near to adjacent channels, a UE may cause interference into the adjacent channel because of nonlinearities or image signals created during signal modulation and amplification. LTE transmission should provide sufficient protection against such adjacent band interference while still maintaining reasonable network coverage. Limiting adjacent band interference is particularly important for communication bands that are proximate to public safety systems. The public safety band, for example, is a narrow band system located between 851-859 MHz which can be vulnerable to both broadband and narrow band interference. LTE band 26 is adjacent to the public safety band located and thus emissions on band 26 must be controlled to avoid unnecessary interference with public safety communications.

In order to provide protection from adjacent band interference, LTE transmissions may use PUCCH over provisioning to provide UL control channel protection (narrow band transmission) without power reduction. Alternatively, additional maximum power reduction (A-MPR) for PUSCH could be used to reduce interference while maintaining data coverage.

The optimal A-MPR is dependent on the E-UTRA absolute radio frequency channel number (EARFCN). However, it is desirable to keep testing complexity manageable by not having a different A-MPR for all possible EARFCNs. The various aspects of the present disclosure propose to have 1 network signal (NS) value to define A-MPR for a given out-of-band emission (OOBE) at two fixed channel offsets at the upper edge: >=2 MHz and >=6 MHz. If it would be useful, additional NS values could be defined for different OOBE levels.

Figure 3A:
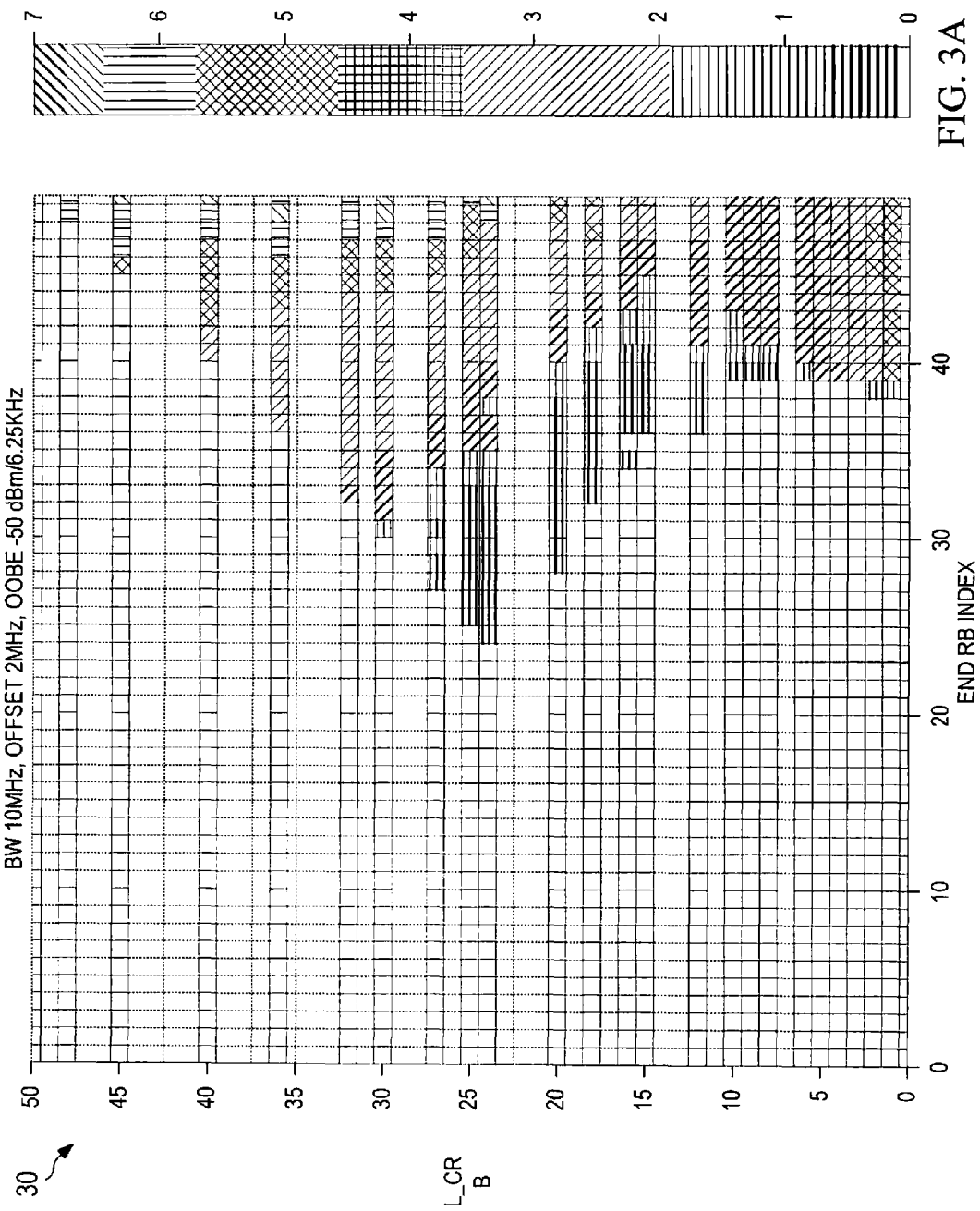
FIGS. 3A-3B are diagrams illustrating an A-MPR tables configured according to one aspect of the present disclosure.

The various aspects of the present disclosure provide for the optimal A-MPRs to be provided in a table encoded using the ending resource block (RB) index (RB_end) and the length of the contiguous RB allocation. Separate tables may be generated for use with a particular channel bandwidth of the transmission channel and a particular channel offset. FIG. 3A is a diagram illustrating an A-MPR table 30 configured according to one aspect of the present disclosure. As illustrated, the x-axis of the table 30 represents the ending RB index of the allocated RBs. The y-axis represents the length of the contiguous RB allocation. The shaded blocks in table 30 represent the associated maximum A-MPR value identified by ending RB index and contiguous RB allocation length. Table 30 represents the optimal A-MPR values as determined for a bandwidth of 10 MHz, and offset of 2 MHz and an OOBE of −50 dBm/6.25 KHz.

Figure 3B:
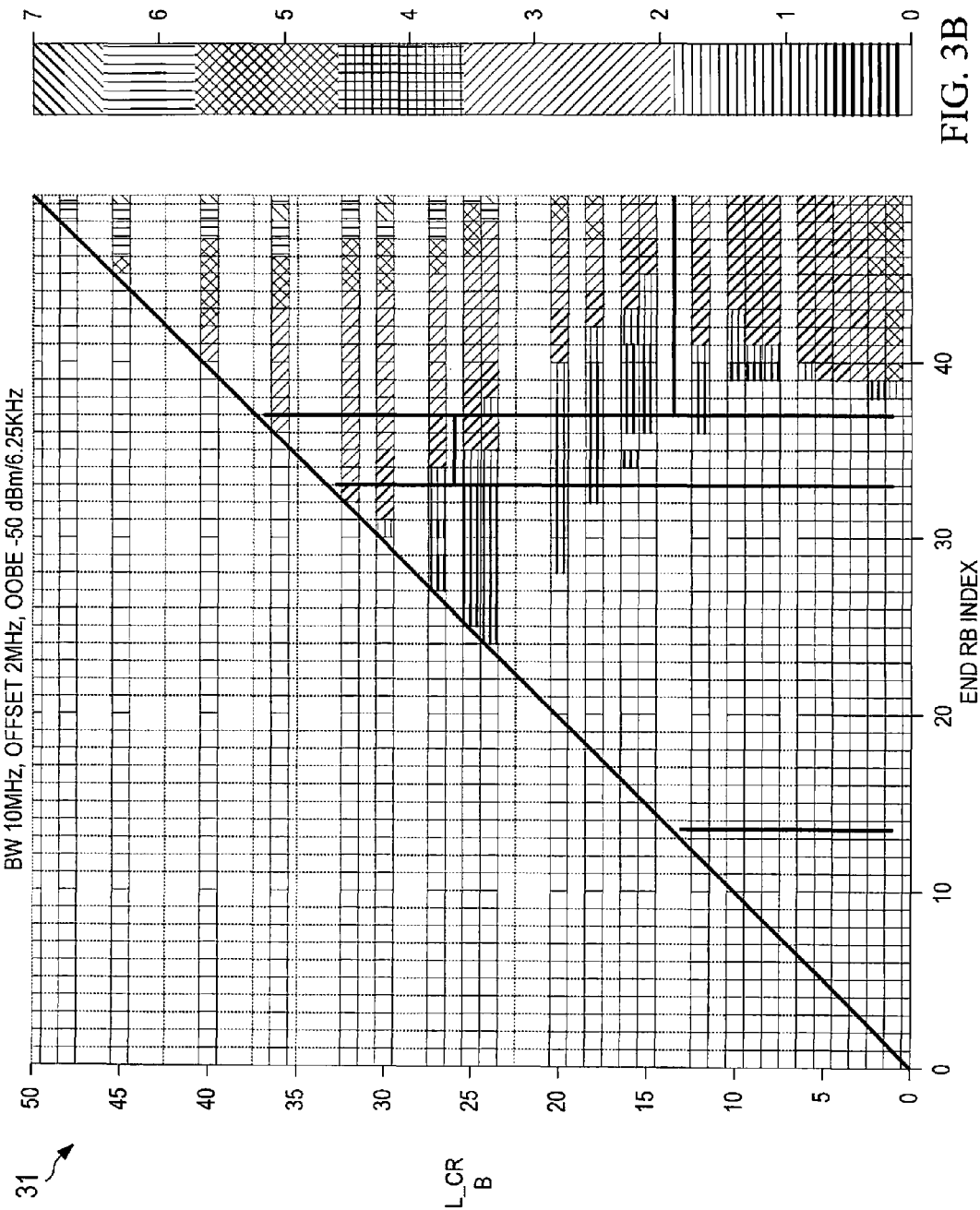

As may be observed from table 30, the shading areas that represent different A-MPR values may be grouped according to ranges of value of ending RB index and contiguous RB allocation length. These associations of A-MPR values may be grouped into multiple regions in which a given A-MPR may be assigned across part or all of the identified region. FIG. 3B is a diagram illustrating an A-MPR table 31 configured according to an additional aspect of the present disclosure. Table 31, which also represents the optimal A-MPR values determined for a bandwidth of 10 MHz, an offset of 2 MHz and an OOBE of −50 dBm/6.25 KHz, as illustrated by table 30 (FIG. 3A), has been divided into four separate regions based on the ending RB index. The first region, region A, covers ending RB indices from 0 to 13. The second region, region B, covers ending RB indices from 13 to 33. The third region, region C, covers ending RB indices from 33 to 37, and the fourth region, region D, covers ending RB indices from 37 to 50.

According to table 31, a UE with allocations falling within regions A and B would have a corresponding A-MPR of 0. Regions C and D are each divided into two sub-regions according to the length of contiguous RB allocation. In region C, when the UE is allocated contiguous RBs less than 26, a first value for A-MPR is provided, while for wideband transmissions, with contiguous RB allocations greater than 26, a higher A-MPR is provided. Similarly, for contiguous RB allocations less than 14 in region D, a UE would identify an A-MPR of a first value, while for wideband transmissions in region D, with contiguous RB allocations greater than 14, a higher A-MPR is provided.

The break points of the different regions in A-MPR tables according to various aspects of the present disclosure may be determined based on the channel bandwidth and distance from the adjacent channel, including the included channel offset value. The different breakpoints may also be defined based on different sources of interference that may arise. Thus, different A-MPR tables will have different breakpoints depending on the transmission and allocation parameters.

Figure 4A:
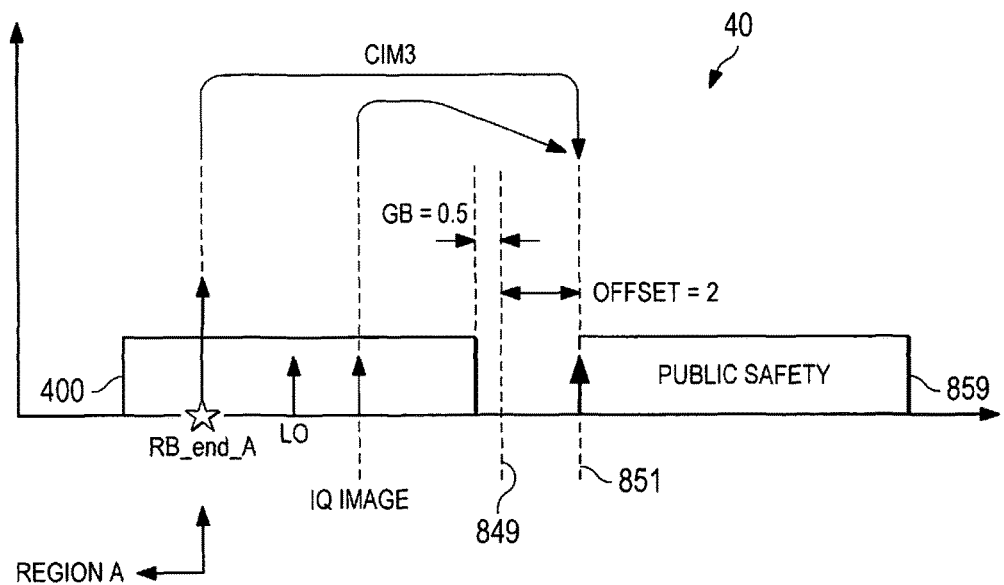
FIGS. 4A-4E are diagrams illustrating graphs of data transmissions selected to identify endpoint parameters of the regions in an A-MPR table configured according to one aspect of the present disclosure.

FIG. 4A is a diagram illustrating graph 40 of a narrow-band data transmission selected to identify the endpoint of the first region in an A-MPR table configured according to one aspect of the present disclosure. The x-axis represents frequency. The transmission channel 400 is offset by 2 MHz from the public safety band and includes a guard band (GB) of 0.5 MHz from the channel edge of 849 MHz. The public safety band covers the spectrum between 851 MHz and 859 MHz. Since the public safety band is at the upper end of the spectrum, the A-MPR is defined with 2 parameters: the ending RB index (RB_end) and the length of the contiguous RB allocation (L_CRB).

The narrow-band data transmission is illustrated at RB_end_A within transmission channel 400. The local oscillator (LO) signal is shown at the center frequency of transmission channel 400. Nonlinearities in amplification and intermodulation of the data transmission cause an IQ image signal to be present at an equal distance from the LO signal as the narrow band data transmission at RB_end_A. An additional third order intermodulation, CIM3, will also appears at 851 MHz. RB_end_A is selected such that CIM3 appears at the edge of the public safety band. As long as the narrow-band data transmission does not move beyond RB_end_A, the resulting CIM3 signal would not cause interference in the public safety band. Accordingly, RB_end_A is identified as the boundary of Region A in an A-MPR table generated according to one aspect of the present disclosure.

RB_end_A is defined according to the following equation:

$$\text{RB\_end\_A} = \max\left(0, \left\lceil \frac{N_{RB} \times 0.18 - f_{offset} - GB}{3 \times 0.18} \right\rceil\right) \quad (1)$$

Where, $N_{RB}$ is the number of RBs, $f_{offset}$ is the channel offset, and GB is the guard band.

Figure 4B:
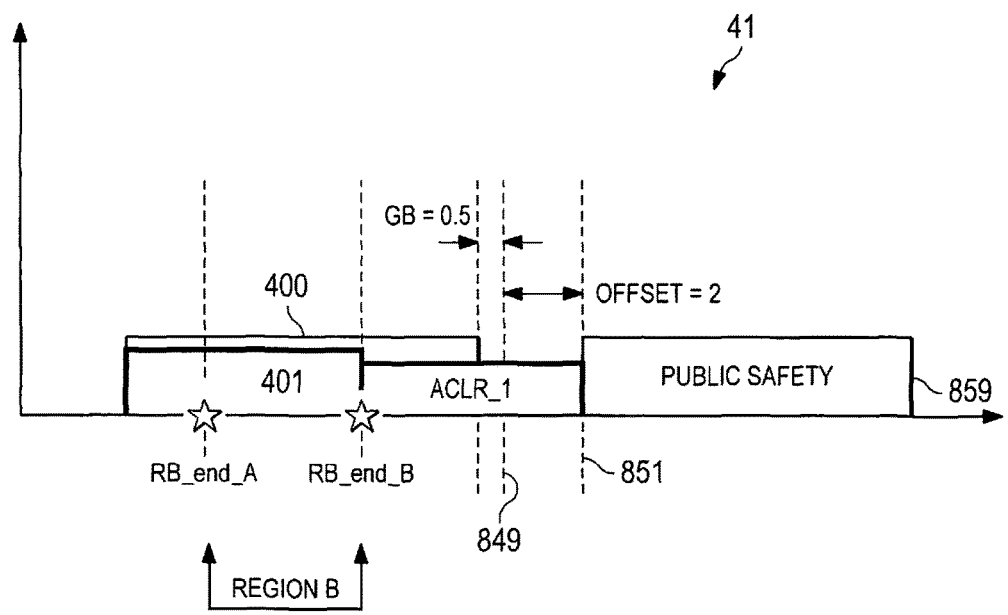

FIG. 4B is a diagram illustrating graph 41 of a wide-band data transmission 401 selected to identify the endpoint of the second region in an A-MPR table configured according to one aspect of the present disclosure. The wide-band data transmission 401 extends beyond RB_end_A to RB_end_B. Wide-band data transmission 401 falls within the transmission channel 400, which is located in the same position as illustrated in FIG. 4A. As long as wide-band data transmission 401 ends at RB_end_B, the adjacent channel leakage ratio (ACLR_1) will not fall within the public safety band. However, should a wide-band data transmission extend beyond RB_end_B, the ACLR_1 would encroach into the public safety band causing interference. Thus, if the RB_end for a UE falls between RB_end_A and RB_end_B, the UE may have either 0 or a low A-MPR. Accordingly, RB_end_B is identified as the boundary of Region B in the A-MPR table generated according to one aspect of the present disclosure.

RB_end_B is defined according to the following equation:

$$\text{RB\_end\_B} = \min\left(N_{RB}, \left\lceil \frac{N_{RB} \times 0.18 + f_{offset} + GB}{2 \times 0.18} \right\rceil\right) \quad (2)$$

Figure 4C:
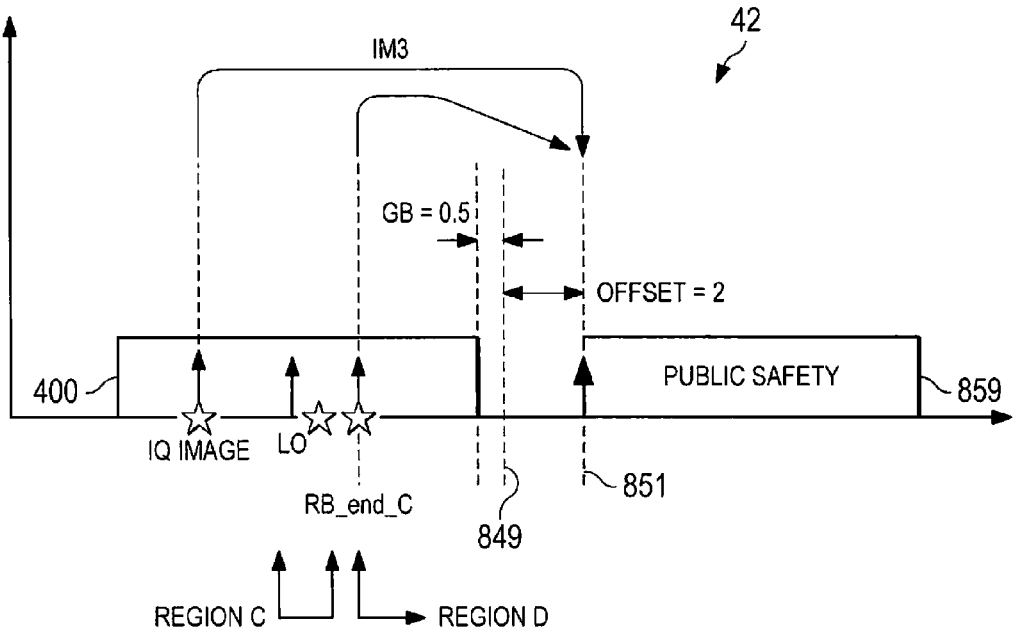

FIG. 4C is a diagram illustrating graph 42 of a narrow-band data transmission selected to identify the endpoint of the second region in an A-MPR table configured according to one aspect of the present disclosure. The narrow-band data transmission is illustrated at RB_end_C. It is illustrated above the LO signal, with the IQ image signal being located at an equal distance on the other side of the LO signal as the narrow-band data transmission. The third-order intermodulation signal, IM3, arises at the edge of the public safety band outside of the transmission channel 400. As long as the narrow-band data transmission does not extend beyond RB_end_C, the IM3 will not cause interference within the public safety band. Accordingly, RB_end_C is identified as the boundary of Region C in the A-MPR table generated according to one aspect of the present disclosure.

RB_end_C is defined according to the following equation:

$$\text{RB\_end\_C} = N_{RB} - 1 - \max\left(0, \left\lceil \frac{N_{RB} \times 0.18 - f_{offset} - GB}{3 \times 0.18} \right\rceil\right) \quad (3)$$

Figure 4D:
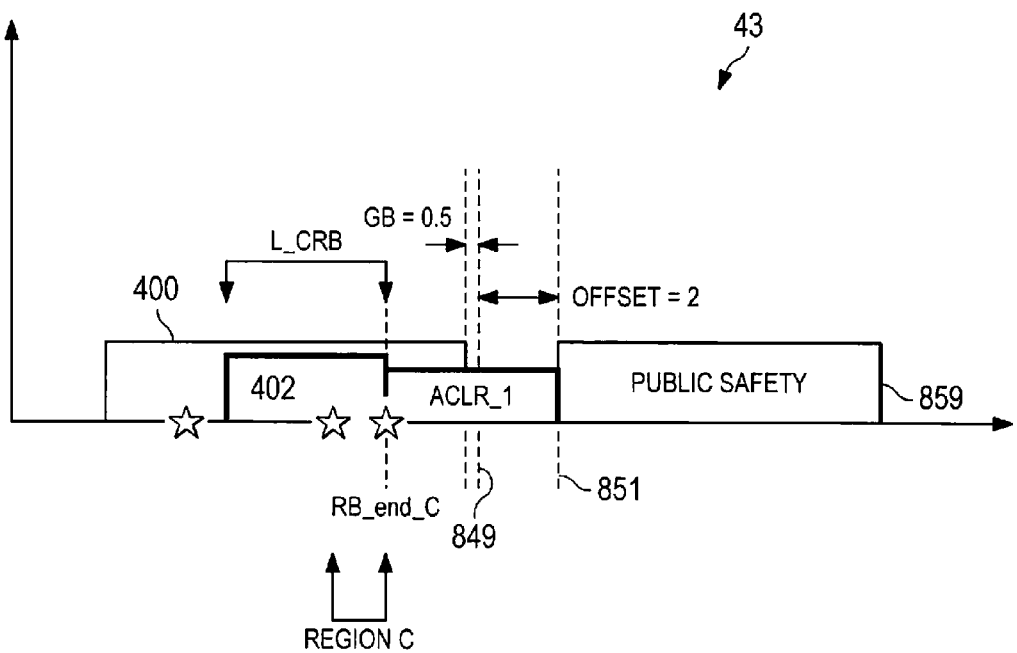

FIG. 4D is a diagram illustrating graph 43 of a wide-band data transmission 402 selected to identify the endpoint of the second region in an A-MPR table configured according to one aspect of the present disclosure. Region C may also include wide-band data transmissions within the transmission channel 400. Wide-band data transmission 402 ends at RB_end_C. As long as wide-band transmission 402 does not extend beyond RB_end_C, the ACLR_1 will not cause interference into the public safety band. For wide-band transmissions, RB_end_C is defined by the following equation:

$$\text{L\_CRB\_C} > \text{RB\_end\_A} + f_{offset} + GB = \min\left(N_{RB}, \left\lceil \frac{N_{RB} \times 0.18 + 2(f_{offset} + GB)}{3 \times 0.18} \right\rceil\right) \quad (4)$$

Figure 4E:
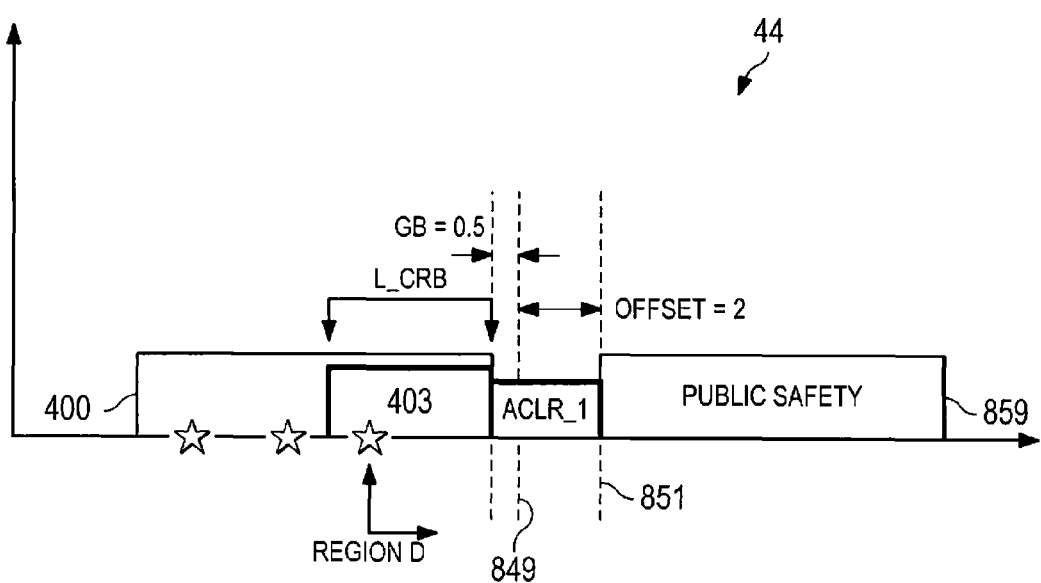

FIG. 4E is a diagram illustrating graph 44 of a wide-band data transmission 403 selected to identify the endpoint of the second region in an A-MPR table configured according to one aspect of the present disclosure. For wide-band transmissions, such as wide-band transmission 403, that end beyond RB_end_C, significant interference may be caused within the public safety band by ACLR_1 if the length of the contiguous RB allocation (L_CRB) exceeds the value defined by the following formula:

$$L\_CRB\_D > \left(N_{RB}, \left\lfloor \frac{f_{offset} + GB}{0.18} \right\rfloor\right) \quad (5)$$

In determining the endpoints of the regions, RB_end_A, RB_end_B, and RB_end_C in FIGS. 4A-E, the four regions, Regions A-D, are identified within the A-MPR table configured according to one aspect of the present disclosure. Once the endpoint parameters are computed for each configuration based on offset and E-UTRA channel bandwidth, a generic table may be generated. The generic table may appear as illustrated in Table 1 below.

illustrates the A-MPR values as encoded or indexed according to ending RB index and length of contiguous RB allocation. However, table 50 represents A-MPR values determined for a bandwidth of 10 MHz, and offset of 2 MHz, and OOBE of −53 dBm/6.25 KHz. Due to the different OOBE values, table 50 includes differing A-MPR values but maintains the simplified groupings and defined regions.

Figure 6A:
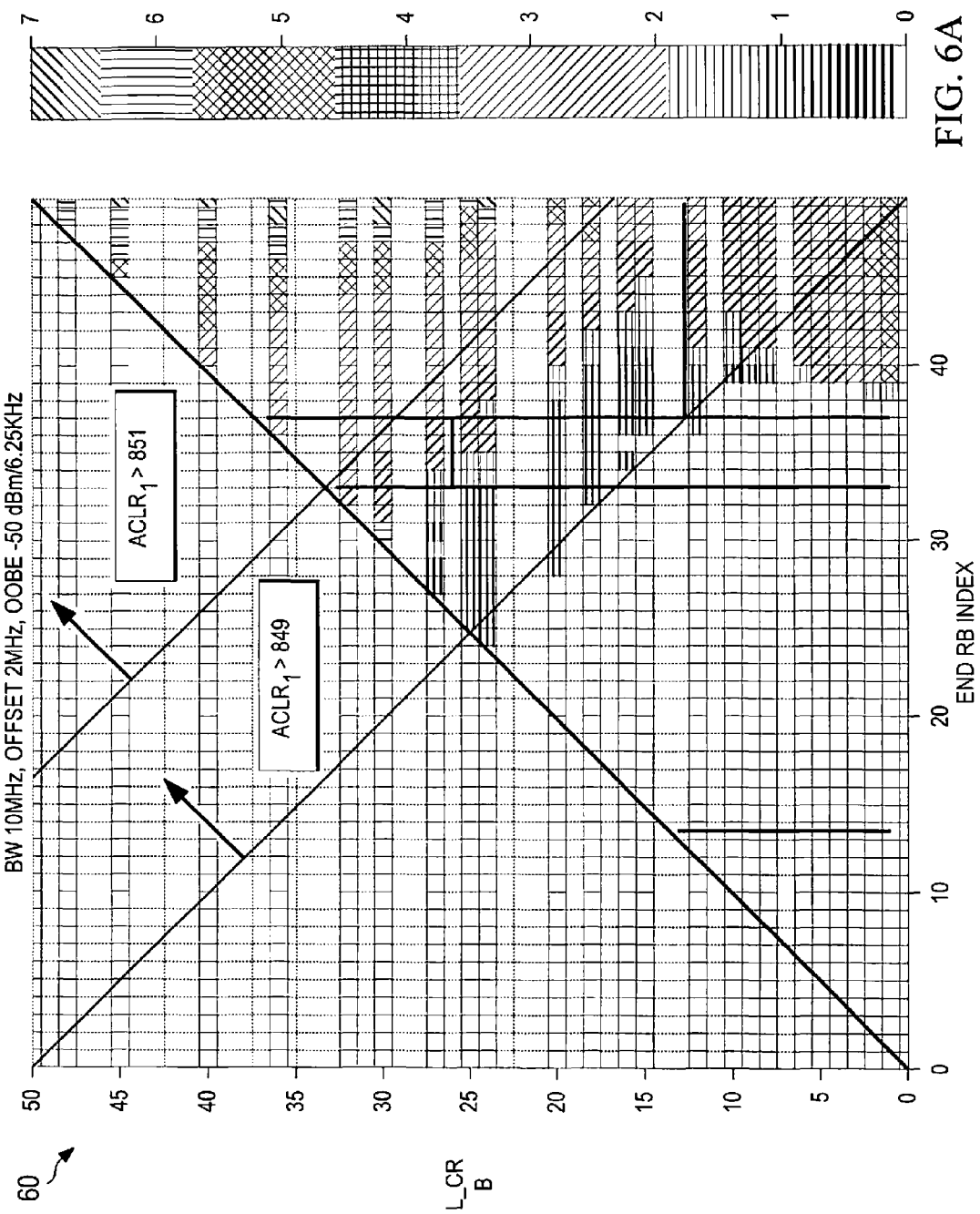
FIGS. 6A-6B are diagrams illustrating A-MPR tables configured according to one aspect of the present disclosure.
Figure 6B:
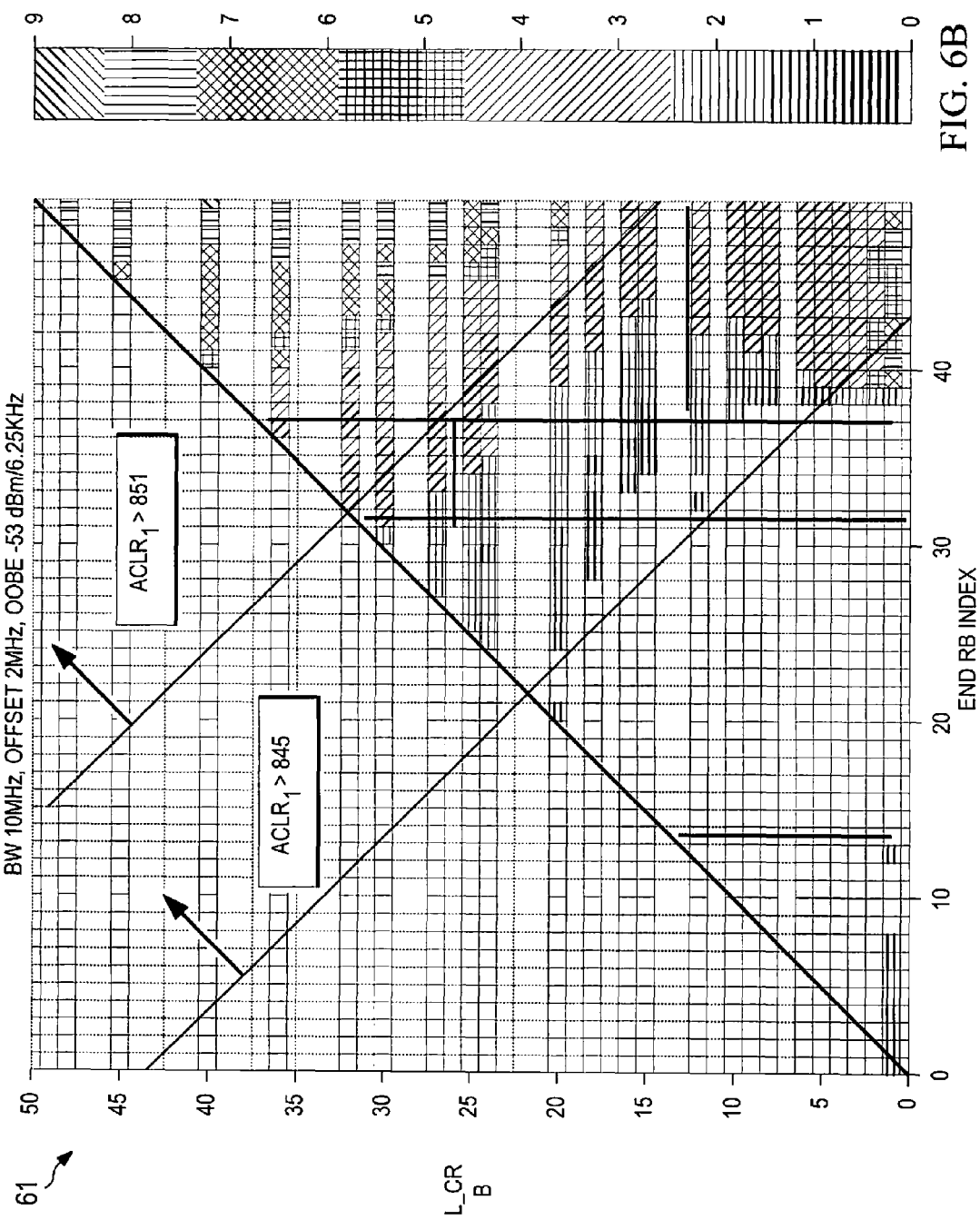

In addition to providing the A-MPR table with defined look-up values, logic may be embedded into the UE to further optimize the A-MPR selection. FIGS. 6A-6B are diagrams illustrating A-MPR tables 60 and 61 configured according to one aspect of the present disclosure. Table 60 is generated for a 10 MHz bandwidth, 2 MHz offset, and −50 dBm/6.25 KHz OOBE. Table 60 is generated for a 10 MHz bandwidth, 2 MHz offset, and −53 dBm/6.25 KHz OOBE. A UE configured according to one aspect of the present disclosure calculates an optimization value, X, equal to L_CRB+RB_end. The optimization value X reflects spec-

TABLE 1

| Parameters | Region A | Region B | Region C | Region D | |
|---|---|---|---|---|---|
| RB_end[1] | 0 to RB_end_A-1 | RB_end_A to RB_end_B-1 | RB_end_B to RB_end_C-1 | RB_end_C to $N_{RB}$ −1 | |
| L_CRB[2] [RBs] | <=narrow band IM3 | ≥Large | ≥L_CRB_C | <L_CRB_D and >narrow band IM3 | Narrow band IM3 or >L_CRB_D |
| A-MPR [dB] | ≤AMPR1 | ≤Moderate | ≤Moderate | ≤Moderate | ≤Significant |

Note
[1]RB_start indicates the highest RB index of transmitted resource blocks
[2]L_CRB is the length of a contiguous resource block allocation
3 For intra-subframe frequency hopping between two regions, notes 1 and 2 apply on a per slot basis.
4 For intra-subframe frequency hopping between two regions, the larger A-MPR value of the two regions may be applied for both slots in the subframe.

As indicated in Table 1, when the RB_end falls beyond RB_end_C within Region D, there are two different A-MPR values possible. When the length of the contiguous RB allocation is less than L_CRB_D and greater than the narrow-band IM3, the A-MPR can be up to a moderate value. Otherwise, when the length of the contiguous RB allocation is the narrow band IM3 or greater than L_CRB_D, then the A-MPR can be up to a significant value.

Based on the foregoing analysis, the following table illustrated exemplary A-MPR parameters for a 2 MHz offset:

TABLE 2

| Offset | 2 MHz | | | | |
|---|---|---|---|---|---|
| BW_ch | 1.4 | 3 | 5 | 10 | 15 |
| RB_end_A | −1 | 2 | 5 | 13 | 20 |
| RB_end_B | −1 | 14 | 19 | 32 | 46 |
| RB_end_C | −1 | 12 | 19 | 36 | 54 |
| L_CRB_C | −1 | 13 | 17 | 26 | 36 |
| L_CRB_D | −1 | 11 | 12 | 13 | 15 |

These results indicate that with 2 MHz offset, potentially 1.4 MHz does not require any significant A-MPR, though other channel bandwidths may need larger A-MPRs.

It should be noted that because A-MPR is strongly dependent on OOBE, many regions may disappear at higher OOBE levels. The break points of the different regions in the A-MPR tables are also a function of the OOBE levels.

Figure 5:
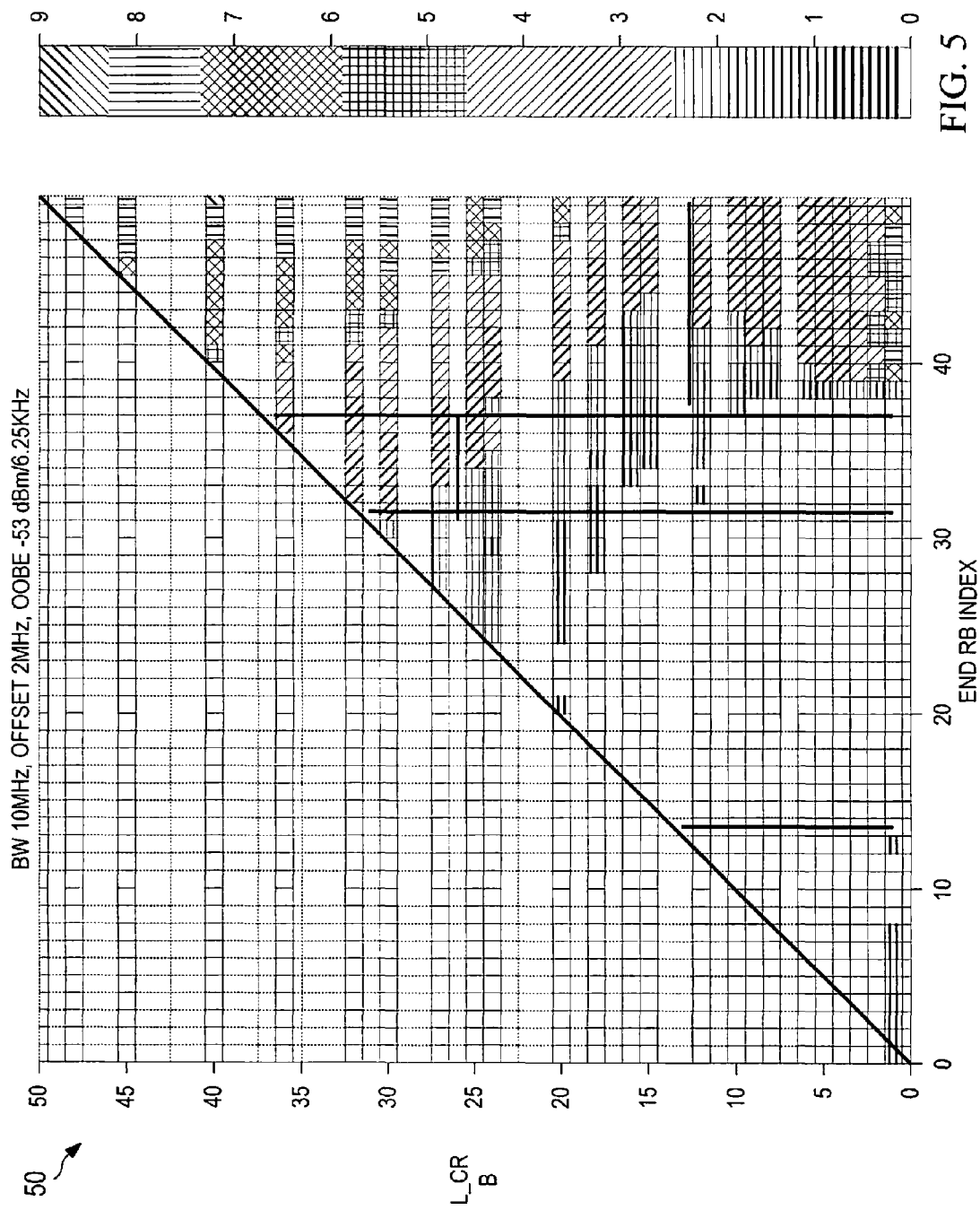
FIG. 5 is a diagram illustrating an A-MPR table configured according to one aspect of the present disclosure.

FIG. 5 is a diagram illustrating an A-MPR table 50 configured according to one aspect of the present disclosure. Similar to the tables 30 and 31 from FIGS. 3A-3B, table 50 trum regrowth, approximately at the ACLR_1. The optimization value X becomes a good predictor of the A-MPR. In the OOBE −50 dBm/6.25 KHz case of table 60, where the optimization value X is less than 50, the A-MPR may be selected as 0. An exception to this is when there is narrow band transmission within region D. Where the optimization value X is greater than 50, the A-MPR will increase almost linearly with X, except for the narrow-band region D transmissions. For table 61, the threshold value becomes 45, but the relationship between A-MPR and the optimization value X remains the same as in table 60.

Figure 7:
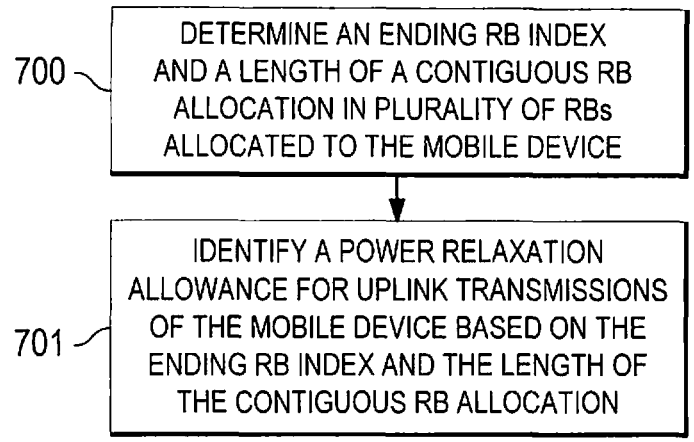
FIG. 7 is a functional block diagram illustrating example blocks executed to implement one aspect of the present disclosure.

FIG. 7 is a functional block diagram illustrating example blocks executed to implement one aspect of the present disclosure. In block 700, a mobile device determines an ending RB index and a length of a contiguous RB allocation in a plurality of RBs allocated to the mobile device. The mobile device then identifies, in block 701, a power relaxation allowance for uplink transmissions of the mobile device based on the ending RB index and the length of the contiguous RB allocation.

Figure 8:
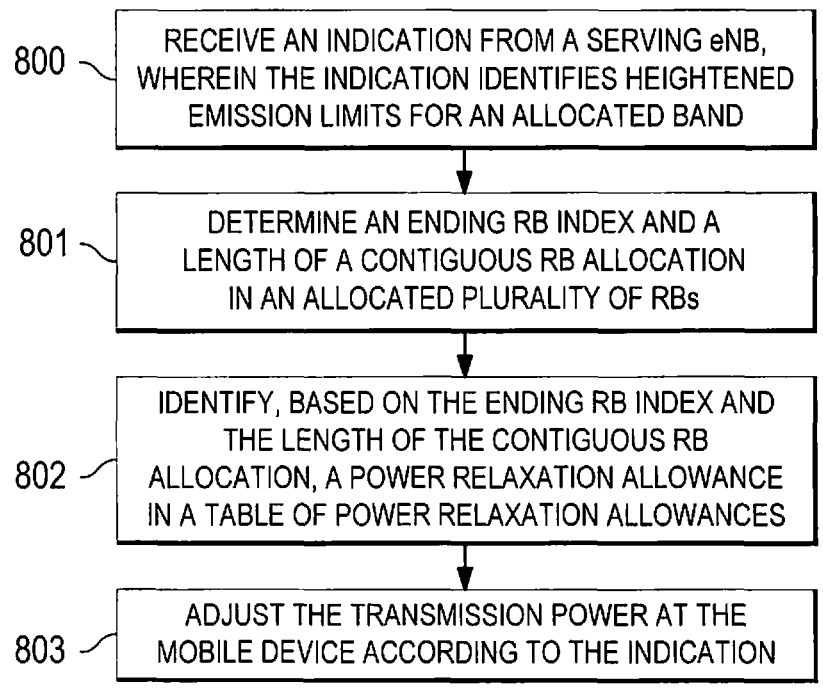
FIG. 8 is a functional block diagram illustrating example blocks executed to implement one aspect of the present disclosure.

FIG. 8 is a functional block diagram illustrating example blocks executed to implement one aspect of the present disclosure. In block 800, a mobile device receives an indication from a serving evolved NodeB (eNB), wherein the indication identifies heightened emission limits for an allocated band. The mobile device determines, in block 801, an ending resource block (RB) index and a length of a contiguous RB allocation in an allocated plurality of RBs. Based on the ending RB index and the length of the contiguous RB allocation, a power relaxation allowance is identified, in block 802, in a table of power relaxation allowances, wherein power relaxation allowances correspond to a plurality of regions defined based on a transmission channel bandwidth and a distance from an adjacent band, and wherein the identified power relaxation allowance is located in one of the plurality of regions associated with the ending RB index and the length of the contiguous RB allocation. In block 803, the mobile device adjusts the transmission power at the mobile device according to the indication.

A UE may periodically provide power headroom reports (PHRs) to inform an eNB of a UE's remaining transmit power in its scheduled configuration. In UEs configured with multiple component carriers, a power headroom report may be defined for each component carrier (CC). The power headroom report may include component carrier-specific reports for the Physical Uplink Control Channel (PUCCH) and the Physical Uplink Shared Channel (PUSCH).

An eNB generally assumes a particular constant maximum power reduction (MPR). For example, a minimum performance requirement may be specified which corresponds to a particular maximum power reduction at the UE. In UEs that are configured with multiple component carriers using carrier aggregation (CA), actual power reduction can vary largely depending on the assignment. Therefore, a UE may actually use different power reduction values (PR) (also referred to as power backoff value) in relation to the MPR, which PR values may be smaller than the value assumed by the eNB. This discrepancy may result in a difference between the power available for transmission at the UE and the power that the eNB believes is available.

An eNB may attempt to estimate transmission power on each component carrier based on the power headroom report and maximum power for that component carrier (Pcmax,c), where 'c' represents the index of the component carrier. Such estimates may be accurate if there is no discrepancy between the power reduction assumed by the eNB and the UE. However, if there is a discrepancy between the power reduction value assumed by the eNB and the UE, there will likely be an error in the transmission power estimate and the estimate of the available power headroom.

Figure 9:
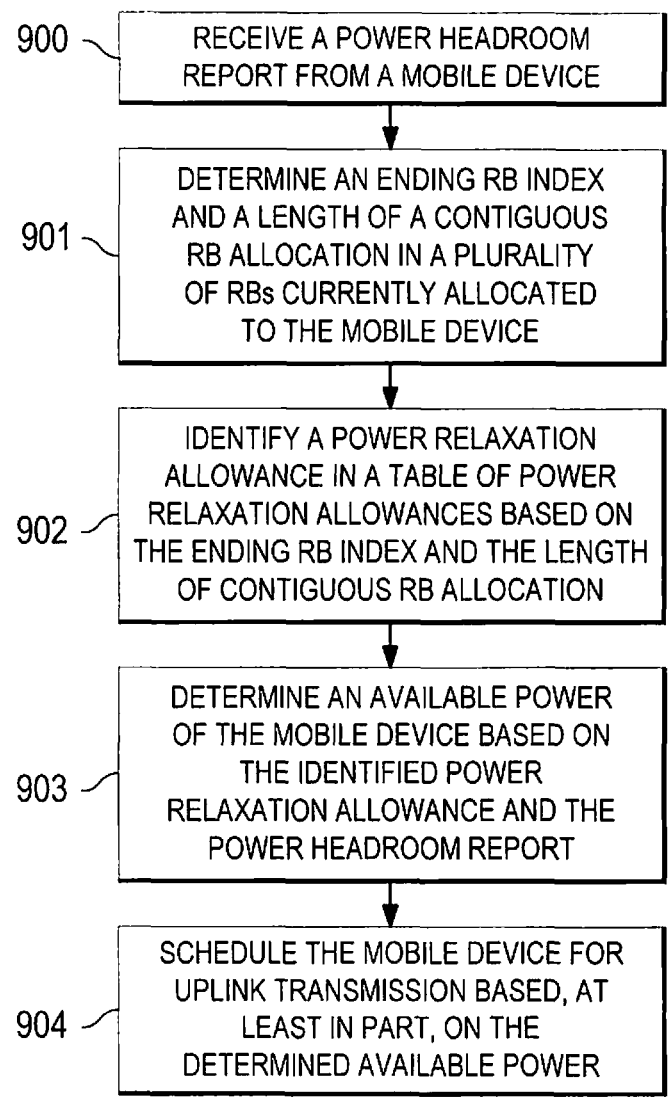
FIG. 9 is a functional block diagram illustrating example blocks executed to implement one aspect of the present disclosure.

In one aspect of the present disclosure, the eNB may attempt to estimate the A-MPR using the disclosed A-MPR tables. FIG. 9 is a functional block diagram illustrating example blocks executed to implement one aspect of the present disclosure. In block 900, an eNB receives a power headroom report from a mobile device. The eNB then determines, in block 901, an ending RB index and a length of a contiguous RB allocation in a plurality of RBs currently allocated to the mobile device. Based on the ending RB index and the length of the contiguous RB allocation, the eNB identifies, in block 902, a power relaxation allowance in a table of power relaxation allowances. The eNB determines, in block 903, an available power of the mobile device based on the identified power relaxation allowance and the power headroom report. In block 904, the eNB schedules the mobile device for uplink transmission based, at least in part, on the determined available power.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 7-9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A computer-readable storage medium may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, non-transitory connections may properly be included within the definition of computer-readable medium. For example, if the instructions are transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   receiving, at an evolved NodeB (eNB), at least one power headroom report from a mobile device;
   determining an ending resource block (RB) index and a length of a contiguous RB allocation in a plurality of RBs currently allocated to the mobile device;
   identifying, based on the ending RB index and the length of the contiguous RB allocation, a power relaxation allowance in a table of power relaxation allowances;
   determining an available power of the mobile device based on the identified power relaxation allowance and the at least one power headroom report; and
   scheduling the mobile device for uplink transmission based, at least in part, on the determined available power, wherein the ending RB index comprises an indication of proximity to a protected band for identifying the power relaxation allowance, and wherein the scheduled uplink transmission by the mobile device does not extend beyond the ending RB index.

2. The method of claim 1, wherein the scheduling comprises:
   allocating a new plurality of RBs in a transmission band; and
   selecting an appropriate modulation and coding scheme (MCS) based, at least in part, on a transmission power.

3. The method of claim 1, wherein the mobile device is configured with multiple component carriers, and wherein the at least one power headroom report includes a power headroom report for each of the multiple component carriers.

4. An apparatus configured for wireless communication, comprising:
   means for receiving, at an evolved NodeB (eNB), a at least one power headroom report from a mobile device;
   means for determining an ending resource block (RB) index and a length of a contiguous RB allocation in a plurality of RBs currently allocated to the mobile device;
   means for identifying, based on the ending RB index and the length of the contiguous RB allocation, a power relaxation allowance in a table of power relaxation allowances;
   means for determining an available power of the mobile device based on the identified power relaxation allowance and the at least one power headroom report; and
   means for scheduling the mobile device for uplink transmission based, at least in part, on the determined available power, wherein the ending RB index comprises an indication of proximity to a protected band for identifying the power relaxation allowance, and wherein the scheduled uplink transmission by the mobile device does not extend beyond the ending RB index.

5. The apparatus of claim 4, wherein the means for scheduling comprises:
   means for allocating a new plurality of RBs in a transmission band; and
   means for selecting an appropriate modulation and coding scheme (MCS) based, at least in part, on a transmission power.

6. The apparatus of claim 4, wherein the mobile device is configured with multiple component carriers, and wherein the at least one power headroom report includes a power headroom report for each of the multiple component carriers.

7. A computer program product for wireless communications in a wireless network, comprising:
   a non-transitory computer-readable medium having program code recorded thereon, the program code comprising program code to cause a computer to:
   receive, at an evolved NodeB (eNB), at least one power headroom report from a mobile device;
   determine an ending resource block (RB) index and a length of a contiguous RB allocation in a plurality of RBs currently allocated in a plurality of candidate RBs for allocation to the mobile device;
   identify, based on the ending RB index and the length of the contiguous RB allocation, a power relaxation allowance in a table of power relaxation allowances;
   determine an available power of the mobile device based on the identified power relaxation allowance and the at least one power headroom report; and
   schedule the mobile device for uplink transmission based, at least in part, on the determined available power, wherein the ending RB index comprises an indication of proximity to a protected band for identifying the power relaxation allowance, and wherein the scheduled uplink transmission by the mobile device does not extend beyond the ending RB index.

8. The computer program product of claim 7, wherein the program code to schedule comprises program code causing the computer to:
   allocate a new plurality of RBs in a transmission band; and
   select an appropriate modulation and coding scheme (MCS) based, at least in part, on a transmission power.

9. The computer program product of claim 7, wherein the mobile device is configured with multiple component carriers, and wherein the at least one power headroom report includes a power headroom report for each of the multiple component carriers.

10. An apparatus configured for wireless communication, the apparatus comprising:
    at least one processor; and
    a memory coupled to said at least one processor,
    wherein the at least one processor is configured:
    to receiving, at an evolved NodeB (eNB), at least one power headroom report from a mobile device;
    to determine an ending resource block (RB) index and a length of a contiguous RB allocation in a plurality of RBs currently allocated to the mobile device;

to identify, based on the ending RB index and the length of the contiguous RB allocation, a power relaxation allowance in a table of power relaxation allowances;

to determine an available power of the mobile device based on the identified power relaxation allowance and the at least one power headroom report; and to schedule the mobile device for uplink transmission based, at least in part, on the determined available power, wherein the ending RB index comprises an indication of proximity to a protected band for identifying the power relaxation allowance, and wherein the scheduled uplink transmission by the mobile device does not extend beyond the ending RB index.

11. The apparatus of claim 10, wherein the configuration of the at least one processor to schedule comprises configuration:

to allocate a new plurality of RBs in a transmission band; and to select an appropriate modulation and coding scheme (MCS) based, at least in part, on a transmission power.

12. The apparatus of claim 10, wherein the mobile device is configured with multiple component carriers, and wherein the at least one power headroom report includes a power headroom report for each of the multiple component carriers.

* * * * *